US011818256B2

(12) United States Patent
Coady et al.

(10) Patent No.: US 11,818,256 B2
(45) Date of Patent: Nov. 14, 2023

(54) PROVIDING CASCADING QUANTUM ENCRYPTION SERVICES IN QUANTUM COMPUTING SYSTEMS

(71) Applicant: Red Hat, Inc., Raleigh, NC (US)

(72) Inventors: Stephen Coady, Waterford City (IE); Leigh Griffin, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 215 days.

(21) Appl. No.: 16/805,920

(22) Filed: Mar. 2, 2020

(65) Prior Publication Data
US 2021/0273792 A1 Sep. 2, 2021

(51) Int. Cl.
H04L 9/08 (2006.01)
G06N 10/00 (2022.01)
H04L 9/00 (2022.01)

(52) U.S. Cl.
CPC .......... *H04L 9/0852* (2013.01); *G06N 10/00* (2019.01); *H04L 9/002* (2013.01); *H04L 9/0819* (2013.01)

(58) Field of Classification Search
CPC ..... H04L 9/0852; H04L 9/002; H04L 9/0819; G06N 10/00
See application file for complete search history.

(56) References Cited

U.S. PATENT DOCUMENTS 8,650,401 B2 2/2014 Wiseman et al.
8,762,728 B2 6/2014 Wiseman
8,855,316 B2* 10/2014 Wiseman .............. H04L 9/0855
380/278
9,692,595 B2* 6/2017 Lowans ................ H04L 9/0858
10,425,401 B1 9/2019 Pecen et al.
(Continued)

FOREIGN PATENT DOCUMENTS

CN 107819760 A 3/2018

OTHER PUBLICATIONS

Alleaume, R. et al., "Using quantum key distribution for cryptographic purposes: A survey," Article in Press, Theoretical Computer Science, 2014, Elsevier B.V., 20 pages.
(Continued)

*Primary Examiner* — Noura Zoubair
*Assistant Examiner* — Zoha Piyadehghibi Tafaghodi
(74) *Attorney, Agent, or Firm* — Dority & Manning, P.A.

(57) ABSTRACT

Providing cascading quantum encryption services is disclosed. In one example, a first quantum computing device provides a plurality of encryption services that include one or more quantum encryption services and one or more classical encryption services. To encrypt a payload for transmission, the first quantum computing device selects a first encryption service from among the plurality of encryption services. The first quantum computing device then detects that the first encryption service is compromised. In response to detecting that the first encryption service is compromised, the first quantum computing device selects a second encryption service from among the plurality of encryption services, and encrypts the payload using the second encryption service. By automatically "cascading" from the first encryption service to the second encryption service in this manner, the first quantum computing device may ensure the secure communication of the payload to the second quantum computing device.

11 Claims, 6 Drawing Sheets

(56) References Cited

U.S. PATENT DOCUMENTS

| | | | |
|---|---|---|---|
| 2016/0149700 A1* | 5/2016 | Fu | H04L 9/0858 |
| | | | 380/278 |
| 2016/0191173 A1* | 6/2016 | Malaney | H04B 10/70 |
| | | | 455/899 |
| 2016/0218867 A1* | 7/2016 | Nordholt | H04L 9/0852 |
| 2016/0248586 A1* | 8/2016 | Hughes | H04L 63/08 |
| 2019/0097792 A1* | 3/2019 | Howe | H04L 9/14 |
| 2019/0260581 A1 | 8/2019 | Su et al. | |
| 2019/0394242 A1* | 12/2019 | Wig | H04L 63/20 |

OTHER PUBLICATIONS

Erven, C. et al., "Entangled Quantum Key Distribution with a Biased Basis Choice," New Journal of Physics, vol. 11, 2009, IOP Publishing Ltd., 16 pages.

* cited by examiner

PROVIDING CASCADING QUANTUM ENCRYPTION SERVICES IN QUANTUM COMPUTING SYSTEMS

BACKGROUND

Quantum computing involves the use of quantum bits, referred to herein as "qubits," which have characteristics that differ from those of classical (i.e., non-quantum) bits used in classical computing. A pair of qubits may experience a physical phenomenon referred to as "entanglement," in which the quantum state of each qubit cannot be described independently of the state of the other qubit. Entanglement of qubits may be exploited by quantum encryption services to provide communication systems in which eavesdropping may be readily detected.

SUMMARY

The examples disclosed herein relate to providing cascading quantum encryption services. In one example, a first quantum computing device may be used to encrypt a payload (e.g., a digital file or a data stream, as non-limiting examples) for transmission via a network connection to a second quantum computing device. The first quantum computing device may provide multiple encryption services that include one or more quantum encryption services (e.g., a quantum key distribution (QKD) encryption service and/or a quantum superdense encoding encryption service, as non-limiting examples) and one or more classical encryption services. To encrypt the payload for transmission, the first quantum computing device selects a first encryption service from among the plurality of encryption services. In some examples, the plurality of encryption services may be ordered according to suitability for use in encrypting the payload, based on factors such as a size of the payload, a speed of the network connection, an available bandwidth of the network connection, and/or network traffic conditions affecting the network connection, as non-limiting examples. The first quantum computing device then detects that the first encryption service is compromised. For instance, where the first encryption service is a quantum encryption service, the first computing device may detect that the first encryption service is compromised based on a change in a state of quantum entanglement between a first qubit and a corresponding second qubit used by the first encryption service. In response to detecting that the first encryption service is compromised, the first quantum computing device selects a second encryption service from among the plurality of encryption services, and encrypts the payload using the second encryption service. By automatically "cascading" from the first encryption service to the second encryption service in this manner, the first quantum computing device may ensure that the payload is securely communicated to the second quantum computing device.

In another example, a method is provided. The method comprises selecting, by a first quantum computing device, a first encryption service from among a plurality of encryption services comprising one or more quantum encryption services and one or more classical encryption services. The method further comprises detecting that the first encryption service has been compromised. The method also comprises, responsive to detecting that the first encryption service has been compromised, selecting a second encryption service from among the plurality of encryption services, and encrypting, using the second encryption service, a payload to be transmitted to a second quantum computing device via a network connection.

In another example, a computing system is provided. The computing system comprises a first quantum computing device that comprises a first system memory and a first quantum processor device coupled to the first system memory. The first quantum processor device is to select a first encryption service from among a plurality of encryption services comprising one or more quantum encryption services and one or more classical encryption services. The first quantum processor device is further to detect that the first encryption service has been compromised. The first quantum processor device is further to, responsive to detecting that the first encryption service has been compromised, select a second encryption service from among the plurality of encryption services, and encrypt, using the second encryption service, a payload to be transmitted to a second quantum computing device via a network connection.

In another example, a computer program product is provided. The computer program product is stored on a non-transitory computer-readable storage medium, and includes computer-executable instructions to cause a quantum processor device to select a first encryption service from among a plurality of encryption services comprising one or more quantum encryption services and one or more classical encryption services. The computer-executable instructions further cause the quantum processor device to detect that the first encryption service has been compromised. The computer-executable instructions also cause the quantum processor device to, responsive to detecting that the first encryption service has been compromised, select a second encryption service from among the plurality of encryption services, and encrypt, using the second encryption service, a payload to be transmitted to a second quantum computing device via a network connection.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
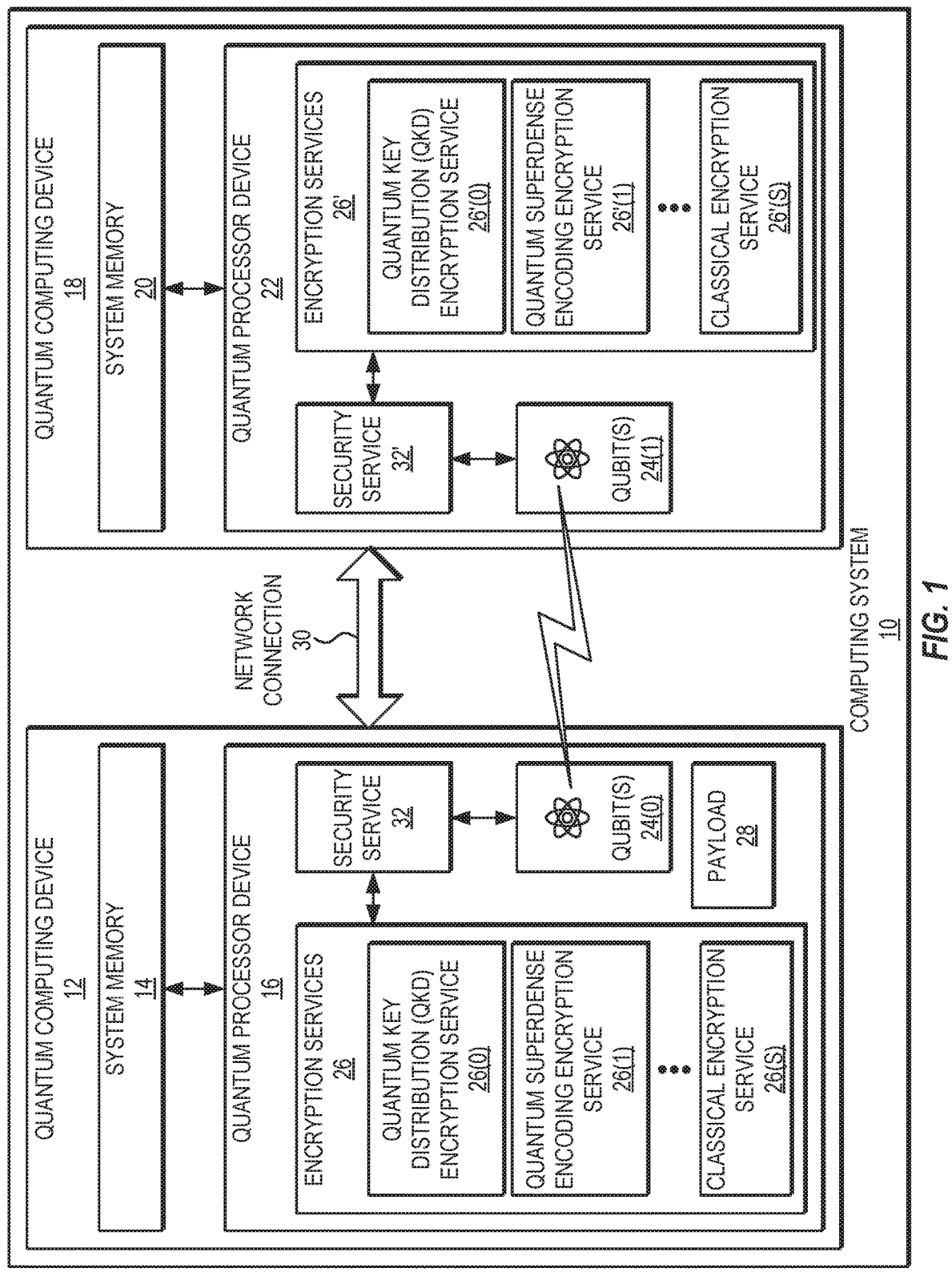
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits." A qubit encodes quantum information for an underlying particle such as an atom or a photon, and possesses characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

The phenomenon of entanglement underlies a quantum communication protocol known as "superdense encoding," which allows two classical bits of information to be transmitted from a sender to a recipient by sending only one qubit from the sender to the recipient. To use superdense encoding, the sender and the recipient each must first be in possession of one qubit of a pair of entangled qubits. The sender can then encode two classical bits of information by manipulating the sender's entangled qubit (i.e., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient, the recipient can then perform measurements on the pair of entangled qubits to decode the two classical bits of information.

Entanglement is also used in some implementations of a cryptographic protocol known as quantum key distribution (QKD). In entanglement-based QKD, the sender and the recipient again must be in possession of multiple pairs of entangled qubits. A random subset of the entangled qubits is selected and measured locally to ensure that the qubits are in a maximally entangled state. If so, the sender encrypts the data to be transmitted using the sender's qubits, and sends the qubits to the recipient using quantum teleportation. The recipient can then perform measurements on the qubits to decrypt the encrypted data. Other implementations of QKD do not use entangled qubits, but instead are "prepare and measure" (P&M) protocols that use pairs of states, such as photon polarization states, to encrypt data.

The process of measuring a quantum system (e.g., measuring a state of an entangled qubit, as a non-limiting example) disturbs the quantum system in a manner that is readily detectable. As a result, a quantum encoding and encryption protocol may provide the sender and the recipient with the ability to detect whether the protocol has been compromised (e.g., by the presence of an eavesdropping intermediary).

In this regard, the examples disclosed herein relate to providing cascading quantum encryption services. In one example, a first quantum computing device may be used to encrypt a payload for transmission via a network connection to a second quantum computing device. The first quantum computing device may provide multiple encryption services that include one or more quantum encryption services and one or more classical encryption services. To encrypt the payload for transmission, the first quantum computing device selects a first encryption service from among the plurality of encryption services. The first quantum computing device then detects that the first encryption service is compromised. In response to detecting that the first encryption service is compromised, the first quantum computing device selects a second encryption service from among the plurality of encryption services, and encrypts the payload using the second encryption service. By automatically "cascading" from the first encryption service to the second encryption service in this manner, the first quantum computing device may ensure the secure communication of the payload to the second quantum computing device.

FIG. 1 is a block diagram of a computing system 10 in which examples may be practiced. The computing system 10 includes a first quantum computing device 12 that comprises a first system memory 14 and a first quantum processor device 16, and also includes a second quantum computing device 18 that comprises a second system memory 20 and a second quantum processor device 22. It is to be understood that the computing system 10 according to some examples may include other classical computing devices and/or additional quantum computing devices that are not illustrated in FIG. 1. Additionally, the first quantum computing device 12 and the second quantum computing device 18 in some examples may include constituent elements in addition to those illustrated in FIG. 1.

The first quantum processor device 16 of the first quantum computing device 12 maintains one or more qubits 24(0) that are in an entangled state with a corresponding one or more qubits 24(1) maintained by the second quantum processor device 22 of the second quantum computing device 18. According to some examples, prior to the computing system 10 performing the operations described in greater detail below, an entangled state is induced between the qubit(s) 24(0) and the corresponding qubit(s) 24(1). Inducing the entangled state between the qubit(s) 24(0) and the qubit(s) 24(1) may be performed, e.g., by a quantum computing device using Quantum Assembly (QASM) files to apply a Hadamard gate to the qubit(s) 24(0) to place them in a state of superposition, and then apply a CNOT gate to the corresponding qubit(s) 24(1), as a non-limiting example. Qubits such as the qubit(s) 24(0) and the corresponding qubit(s) 24(1) may be transferred among the first quantum computing device 12 and the second quantum computing device 18 in the form of photons transmitted via fiber optic cabling or through free space using pulsed lasers, as non-limiting examples.

As seen in FIG. 1, the first quantum processor device 16 of the first quantum computing device 12 provides a plurality of encryption services 26. Each of the encryption services 26 may be implemented as a hardware logic circuit of the first quantum processor device 16, or as computer-executable instructions stored on a non-transitory computer readable medium and executed by the first quantum processor device 16. Each of the plurality of encryption services 26 implements an encryption protocol that may be used to encrypt or decrypt a payload 28 transmitted from the first quantum computing device 12 to the second quantum computing device 18 via a conventional classical network connection 30. In the example of FIG. 1, the encryption services 26 include a QKD encryption service 26(0) and a quantum superdense encoding encryption service 26(1), each of which may be configured to use the one or more qubits 24(0) to encrypt the payload 28 according to their respective encryption protocols. The encryption services 26 further include a classical encryption service 26(S), which is configured to provide a conventional non-quantum encryption protocol.

The second quantum processor device 22 of the second quantum computing device 18 also provides a plurality of encryption services 26', including a QKD encryption service 26'(0), a quantum superdense encoding encryption service 26'(1), and a classical encryption service 26'(S), that correspond in functionality to the plurality of encryption services 26 of the first quantum processor device 16. It is to be understood that the plurality of encryption services 26 of the first quantum processor device 16 and the plurality of encryption services 26' of the second quantum computing device 18 may include more or fewer quantum encryption services and/or more or fewer classical encryption services than illustrated in FIG. 1.

In the example of FIG. 1, the first quantum processor device 16 and the second quantum processor device 22 provide security services 32 and 32', respectively, which handle the selection of an appropriate one of the plurality of encryption services 26, 26' for use in encryption and decryption, respectively. In an example use case, the first quantum computing device 12 seeks to encrypt the payload 28 for transmission to the second quantum computing device 18 via the network connection 30. The payload 28 may comprise a data file or a data stream, as non-limiting examples.

The security service 32 of the first quantum processor device 16 selects a first encryption service of the plurality of encryption services 26, such as the QKD encryption service 26(0), for use in encrypting the payload 28. In some examples, the security service 32 may first order the plurality of encryption services 26 in order of suitability for encrypting the payload 28 based on, as non-limiting examples, a size of the payload 28, a speed of the network connection 30, an available bandwidth of the network connection 30, and/or network traffic conditions affecting the network connection 30. The security service 32 may then select one of the plurality of encryption services 26 that is indicated as the most suitable encryption service as the first encryption service. Alternatively, in some examples, the security service 32 may randomly select one of the plurality of encryption services 26 as the first encryption service.

The security service 32 of the first quantum processor device 16 then detects that the first encryption service has been compromised (e.g., by the presence of an intermediate third party monitoring communications between the first quantum computing device 12 and the second quantum computing device 18). For instance, if the first encryption service is a quantum encryption service such as the QKD encryption service 26(0) or the quantum superdense encoding encryption service 26(1), the security service 32 may detect that the first encryption service has been compromised by detecting a change in a state of quantum entanglement between the qubit(s) 24(0) and the corresponding qubit(s) 24(1) used by the quantum encryption service. Upon determining that the first encryption service has been compromised, the security service 32 automatically "cascades" to an alternate encryption protocol by selecting a second encryption service of the plurality of encryption services 26 (e.g., the quantum superdense encoding encryption service 26(1), as a non-limiting example). In examples in which the plurality of encryption services 26 were previously ordered by suitability for encrypting the payload 28, the security service 32 may select the second encryption service by selecting the next most suitable encryption service after the first encryption service as the second encryption service. According to some examples, the security service 32 may select the second encryption service by randomly selecting one of the plurality of encryption services 26 as the second encryption service. The security service 32 then encrypts the payload 28 using the second encryption service, and transmits the encrypted payload 28 to the second quantum computing device 18 via the network connection 30.

Figure 2A:
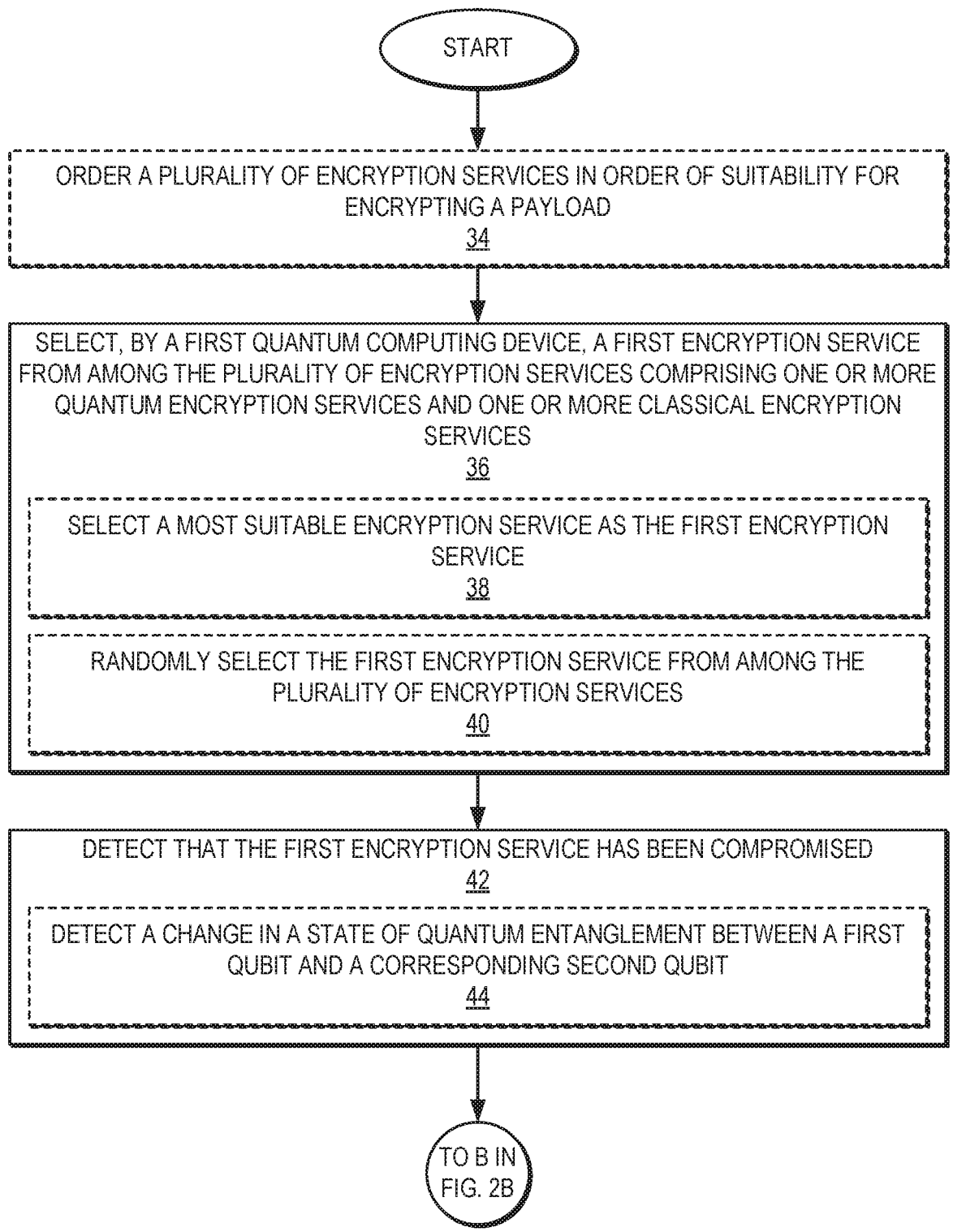
FIGS. 2A and 2B are flowcharts illustrating operations for providing cascading quantum encryption services, according to one example.
Figure 2B:
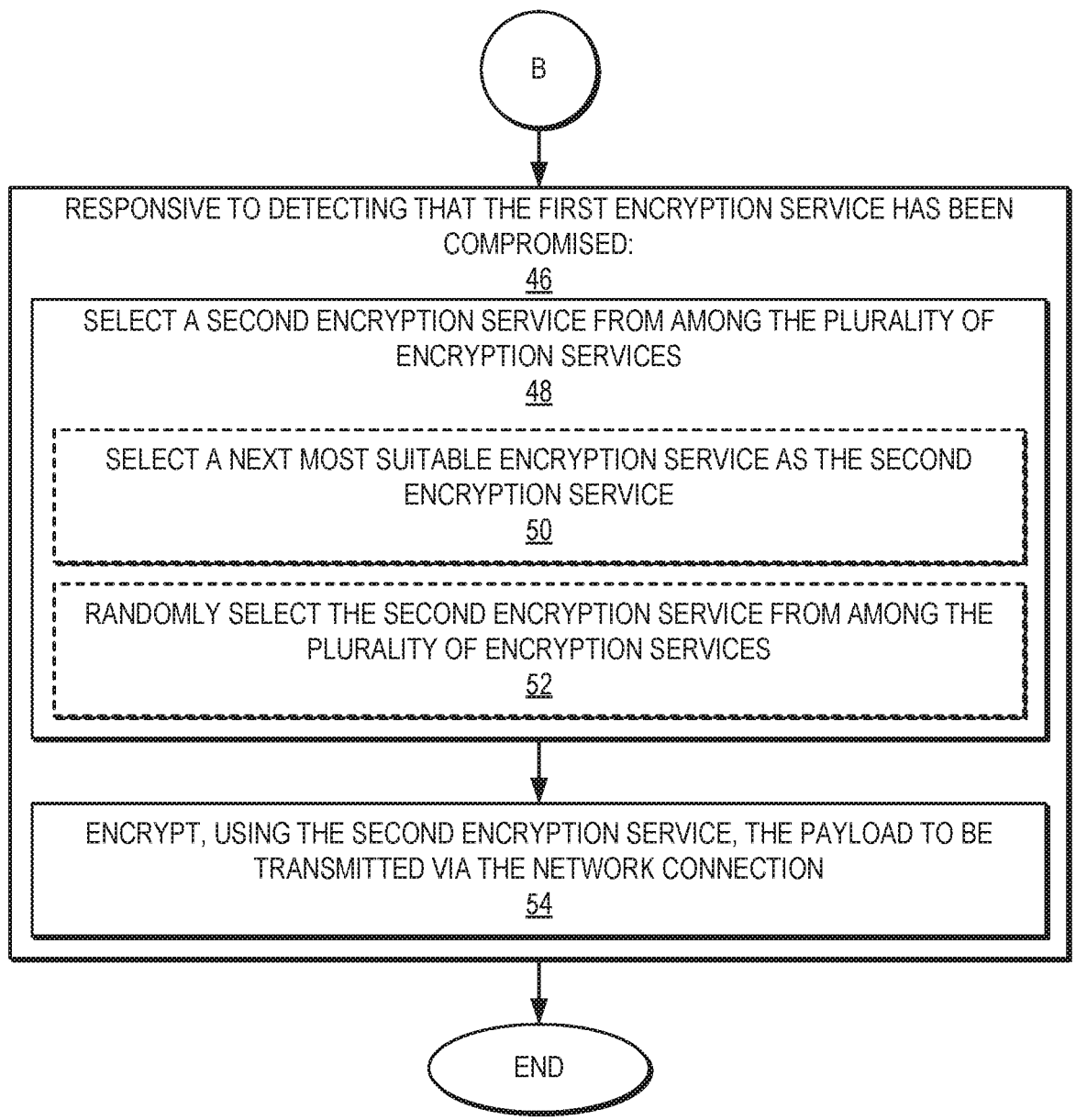

To illustrate operations for providing cascading quantum encryption services according to one example, FIGS. 2A and 2B are provided. Elements of FIG. 1 are referenced in describing FIGS. 2A and 2B for the sake of clarity. Operations according to some examples begin in FIG. 2A with the first quantum computing device 12 ordering the plurality of encryption services 26(0)-26(S)) in order of suitability for encrypting the payload 28 (block 34). The first quantum computing device 12 selects a first encryption service (such as the QKD encryption service 26(0), as a non-limiting example) from among the plurality of encryption services 26(0)-26(S) comprising one or more quantum encryption services 26(0), 26(1) and one or more classical encryption services 26(S) (block 36). In some examples, the operations of block 36 for selecting the first encryption service 26(0) may comprise selecting a most suitable encryption service as the first encryption service 26(0) (block 38). Some examples may provide that the operations of block 36 for selecting the first encryption service 26(0) comprise randomly selecting the first encryption service 26(0) from among the plurality of encryption services 26(0)-26(S) (block 40).

The first quantum computing device 12 next detects that the first encryption service 26(0) has been compromised (block 42). According to some examples, the operations of block 42 for detecting that the first encryption service 26(0) has been compromised may comprise detecting a change in a state of quantum entanglement between a first qubit (e.g., one of the qubit(s) 24(0)) and a corresponding second qubit (e.g., one of the corresponding qubit(s) 24(1)) (block 44). Operations then continue at block 46 of FIG. 2B.

Referring now to FIG. 2B, the first quantum computing device 12 performs a series of operations responsive to detecting that the first encryption service 26(0) has been compromised, as indicated by block 46. The first quantum computing device 12 first selects a second encryption service (such as the quantum superdense encoding encryption service 26(1), as a non-limiting example) from among the plurality of encryption services 26(0)-26(S) (block 48). In some examples, the operations of block 48 for selecting the second encryption service 26(1) may comprise selecting a next most suitable encryption service as the second encryption service 26(1) (block 50). Some examples may provide that the operations of block 48 for selecting the second encryption service 26(1) comprise randomly selecting the second encryption service 26(1) from among the plurality of encryption services 26(0)-26(S) (block 52). The first quantum computing device 12 then encrypts, using the second encryption service 26(1), the payload 28 to be transmitted to the second quantum computing device 18 via the network connection 30 (block 54).

Figure 3:
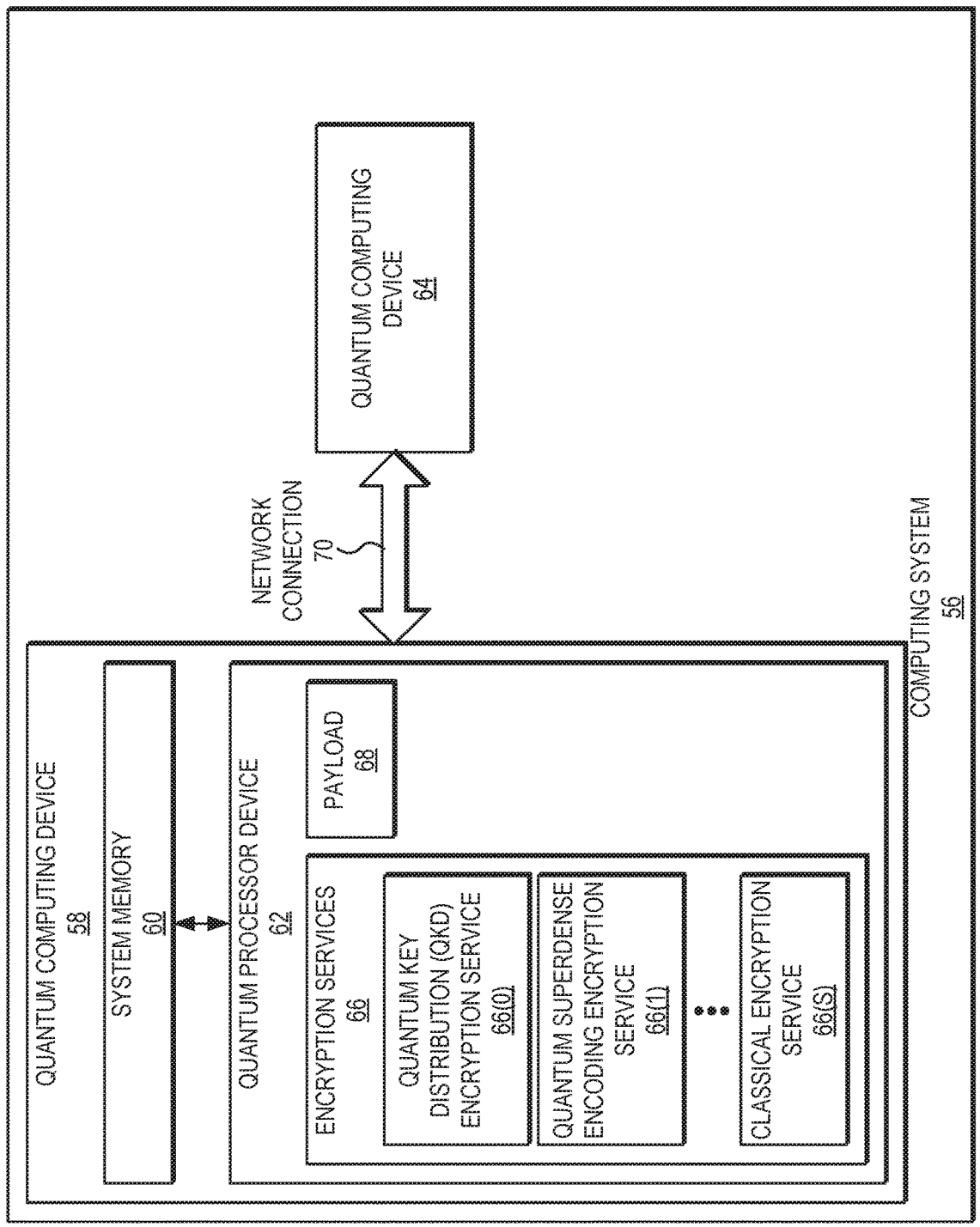
FIG. 3 is a simpler block diagram of the computing system of FIG. 1 for providing cascading quantum encryption services, according to one example.

FIG. 3 is a simpler block diagram of the computing system 10 of FIG. 1 for providing cascading quantum encryption services according to some examples. In FIG. 3, a computing system 56 includes a first quantum computing device 58 that comprises a system memory 60 and a quantum processor device 62, and also includes a second quantum computing device 64. The quantum processor device 62 of the first quantum computing device 58 provides a plurality of encryption services 66, each of which may be implemented as a hardware logic circuit of the quantum processor device 62, or as computer-executable instructions stored on a non-transitory computer readable medium and executed by the quantum processor device 62. The encryption services 66 each implement an encryption protocol that may be used to encrypt or decrypt a payload 68 (e.g., for transmission from the first quantum computing device 58 to the second quantum computing device 64 via a network connection 70). In the example of FIG. 3, the plurality of encryption services 66 includes a QKD encryption service 66(0) and a quantum superdense encoding encryption service 66(1). The plurality of encryption services 66 further includes a classical encryption service 66(S), which is configured to provide a conventional non-quantum encryption protocol.

In the example of FIG. 3, the first quantum computing device 58 seeks to encrypt the payload 68 for transmission to the second quantum computing device 64 via the network connection 70. The first quantum computing device 58 selects a first encryption service of the plurality of encryption services 66, such as the QKD encryption service 66(0), for use in encrypting the payload 68. The first quantum computing device 58 then detects that the first encryption service has been compromised (e.g., by the presence of an intermediate third party monitoring communications between the first quantum computing device 58 and the second quantum computing device 64). Upon determining that the first encryption service has been compromised, the first quantum computing device 58 automatically "cascades" to an alternate encryption protocol by selecting a second encryption service of the plurality of encryption services 66 (e.g., the quantum superdense encoding encryption service 66(1), as a non-limiting example). The first quantum computing device 58 then encrypts the payload 68 using the second encryption service.

Figure 4:
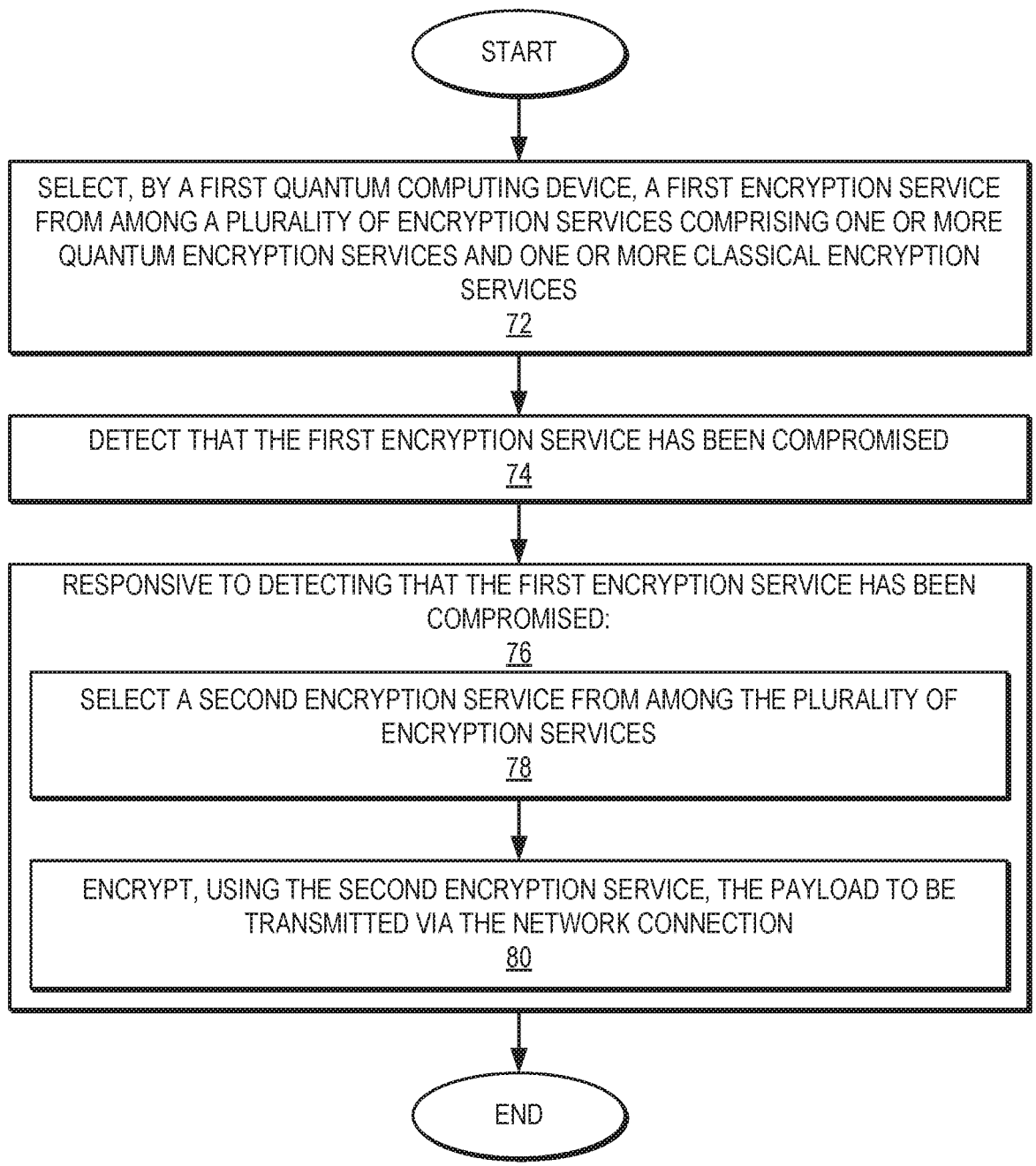
FIG. 4 is a flowchart of a simplified method for providing cascading quantum encryption services in the computing system of FIG. 3, according to one example.

FIG. 4 is a flowchart of a simplified method for providing cascading quantum security services according to some examples. For the sake of clarity, elements of FIG. 3 are referenced in describing FIG. 4. In FIG. 4, operations begin with the first quantum computing device 58 selecting a first encryption service, such as the QKD encryption service 66(0), from among the plurality of encryption services 66(0)-66(S) comprising one or more quantum encryption services 66(0), 66(1) and one or more classical encryption services 66(S) (block 72). The first quantum computing device 58 detects that the first encryption service 66(0) has been compromised (block 74). The first quantum computing device 58, responsive to detecting that the first encryption service 66(0) has been compromised, then performs a series of operations, as indicated by block 76. The first quantum computing device 58 selects a second encryption service, such as the quantum superdense encoding encryption service 66(1), from among the plurality of encryption services 66(0)-66(S) (block 78). The first quantum computing device 58 then encrypts, using the second encryption service 66(1), the payload 68 to be transmitted to the second quantum computing device 64 via the network connection 70 (block 80).

Figure 5:
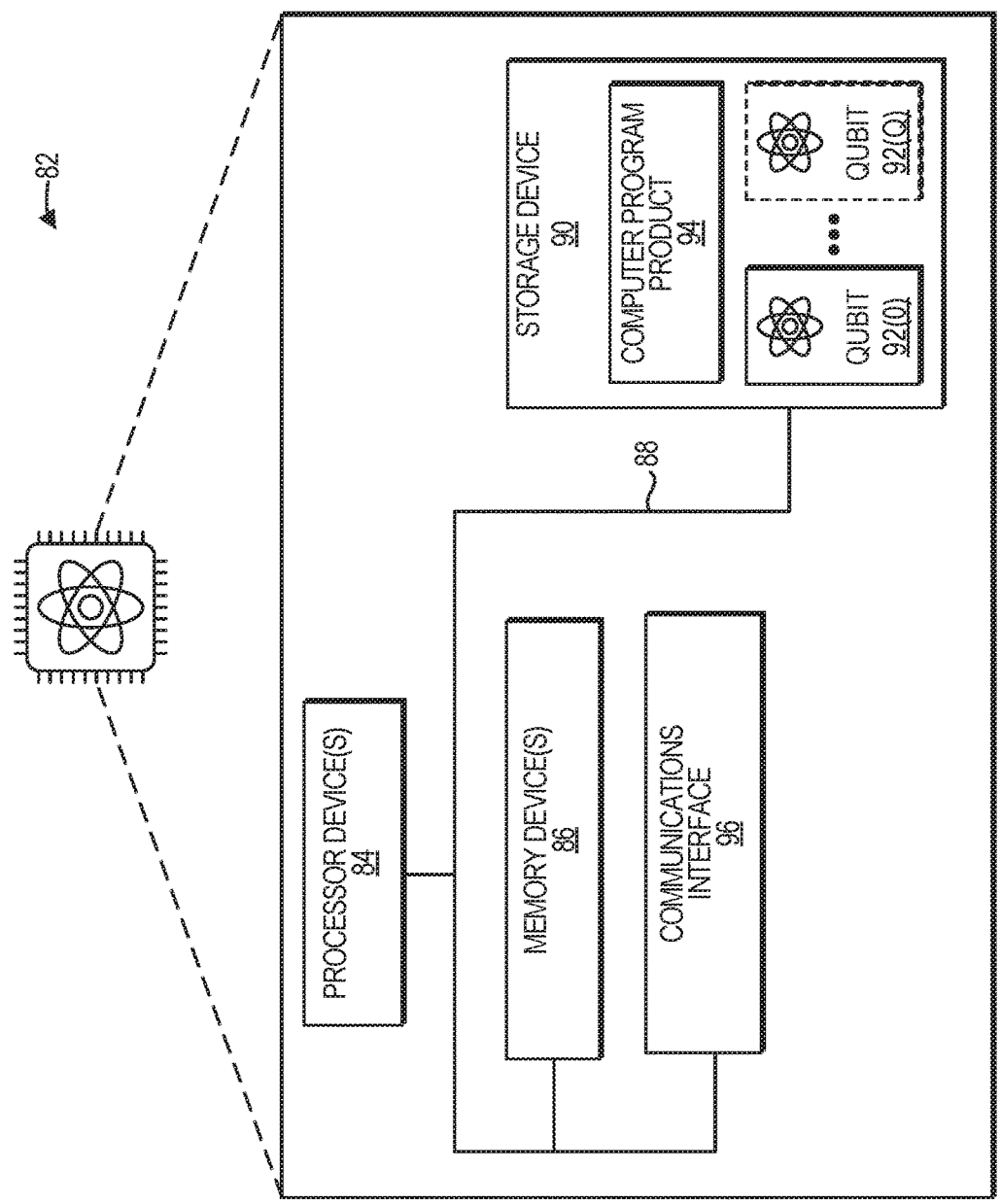
FIG. 5 is a block diagram of a quantum computing device suitable for implementing examples, according to one example.

FIG. 5 is a block diagram of a quantum computing device 82, such as the first quantum computing device 12 and the second quantum computing device 18 of FIG. 1, suitable for implementing examples according to one example. The quantum computing device 82 may comprise any computing or electronic device capable of including firmware, hardware, and/or executing software instructions to implement the functionality described herein in a quantum environment. The quantum computing device 82 includes one or more processor device(s) 84, one or more memory device(s) 86, and a system bus 88. The system bus 88 provides an interface for system components including, but not limited to, the one or more memory device(s) 86 and the one or more processor device(s) 84. The one or more processor device(s) 84 can be any commercially available or proprietary processor suitable for operating in a quantum environment. The quantum computing device 82 may further include or be coupled to a non-transitory computer-readable storage medium such as a storage device 90. The storage device 90 and other drives associated with computer-readable media and computer-usable media may provide non-volatile storage of data, data structures, computer-executable instructions, and the like. The storage device 90 may also store one or more qubits 92(0)-92(Q), which may be measured and/or manipulated by the one or more processor device(s) 84 when performing quantum computing operations.

All or a portion of the examples may be implemented as a computer program product 94 stored on a transitory or non-transitory computer-usable or computer-readable storage medium, such as the storage device 90, which includes complex programming instructions, such as complex computer-readable program code, to cause the one or more processor devices 84 to carry out the steps described herein. Thus, the computer-readable program code can comprise software instructions for implementing the functionality of the examples described herein when executed on the one or more processor devices 84.

An operator may also be able to enter one or more configuration commands through a keyboard (not illustrated), a pointing device such as a mouse (not illustrated), or a touch-sensitive surface (not illustrated). The quantum computing device 82 may also include a communications interface 96 suitable for communicating with other computing devices, including, in some implementations, classical computing devices.

The examples also facilitate an improvement to computer functionality itself by providing a federated messaging mechanism to intelligently route quantum information transmitted over a communications network among quantum computing devices, resulting in improved functionality of computing devices on the communications network. Thus, the examples are directed to specific improvements in computer functionality.

What is claimed is:
1. A method, comprising:
ordering, by a first quantum computing device, a plurality of encryption services in order of suitability for encrypting a payload based on one or more of a size of the payload, a speed of a network connection, an available bandwidth of the network connection, and network traffic conditions affecting the network connection to generate an ordered list of the plurality of encryption services;

selecting a first encryption service from the ordered list of the plurality of encryption services, the plurality of encryption services comprising one or more quantum encryption services and one or more classical encryption services configured to implement an encryption protocol for encryption of the payload to be transmitted from the first quantum computing device to a second quantum computing device via the network connection, wherein selecting the first encryption service comprises selecting an encryption service that is first in the ordered list of the plurality of encryption services;

detecting that the first encryption service has been compromised; and responsive to detecting that the first encryption service has been compromised:
   selecting a second encryption service from the ordered list of the plurality of encryption services, wherein selecting the second encryption service comprises automatically selecting an encryption service that is second in the ordered list of the plurality of encryption services; and
   encrypting, using the second encryption service, the payload to be transmitted to the second quantum computing device via the network connection.

2. The method of claim 1, wherein:
the first encryption service comprises a quantum encryption service of the one or more quantum encryption services; and
detecting that the first encryption service is compromised comprises detecting a change in a state of quantum entanglement between a first qubit and a corresponding second qubit.

3. The method of claim 1, wherein the one or more quantum encryption services comprises a quantum key distribution (QKD) encryption service and a quantum superdense encoding encryption service.

4. The method of claim 1, wherein the payload comprises one of a data file and a data stream.

5. A computing system, comprising:
a first quantum computing device, comprising:
   a first system memory; and
   a first quantum processor device coupled to the first system memory;
wherein:
   the first quantum processor device is to:
      order a plurality of encryption services in order of suitability for encrypting a payload based on one or more of a size of the payload, a speed of a network connection, an available bandwidth of the network connection, and network traffic conditions affecting the network connection to generate an ordered list of the plurality of encryption services;
      select a first encryption service from the ordered list of the plurality of encryption services, the plurality of encryption services comprising one or more quantum encryption services and one or more classical encryption services configured to implement an encryption protocol for encryption of the payload to be transmitted from the first quantum computing device to a second quantum computing device via the network connection, wherein to select the first encryption service is to select an encryption service that is first in the ordered list of the plurality of encryption services;
      detect that the first encryption service has been compromised; and
      responsive to detecting that the first encryption service has been compromised:
         select a second encryption service from the ordered list of the plurality of encryption services, wherein to select the second encryption service is to automatically select an encryption service that is second in the ordered list of the plurality of encryption services; and
         encrypt, using the second encryption service, the payload to be transmitted to the second quantum computing device via the network connection.

6. The computing system of claim 5, wherein:
the first encryption service comprises a quantum encryption service of the one or more quantum encryption services; and
to detect that the first encryption service is compromised is to detect a change in a state of quantum entanglement between a first qubit and a corresponding second qubit.

7. The computing system of claim 5, wherein the one or more quantum encryption services comprises a quantum key distribution (QKD) encryption service and a quantum superdense encoding encryption service.

8. The computing system of claim 5, wherein the payload comprises one of a data file and a data stream.

9. A computer program product stored on a non-transitory computer-readable storage medium, the computer program product including computer-executable instructions to cause a quantum processor device of a first quantum computing device to:
order a plurality of encryption services in order of suitability for encrypting a payload based on one or more of a size of the payload, a speed of a network connection, an available bandwidth of the network connection, and network traffic conditions affecting the network connection to generate an ordered list of the plurality of encryption services;
select a first encryption service from the ordered list of the plurality of encryption services, the plurality of encryption services comprising one or more quantum encryption services and one or more classical encryption services configured to implement an encryption protocol for encryption of the payload to be transmitted from the first quantum computing device to a second quantum computing device via the network connection, wherein to select the first encryption service is to select an encryption service that is first in the ordered list of the plurality of encryption services;
detect that the first encryption service has been compromised; and
responsive to detecting that the first encryption service has been compromised:
   select a second encryption service from the ordered list of the plurality of encryption services, wherein to select the second encryption service is to automatically select an encryption service that is second in the ordered list of the plurality of encryption services; and
   encrypt, using the second encryption service, the payload to be transmitted to the second quantum computing device via the network connection.

10. The computer program product of claim 9, wherein:
the first encryption service comprises a quantum encryption service of the one or more quantum encryption services; and
to detect that the first encryption service is compromised is to detect a change in a state of quantum entanglement between a first qubit and a corresponding second qubit.

11. The computer program product of claim 9, wherein the one or more quantum encryption services comprises a quantum key distribution (QKD) encryption service and a quantum superdense encoding encryption service.

* * * * *